United States Patent [19]
Crawford

[11] 3,855,524
[45] Dec. 17, 1974

[54] MEASURING GAUGE WITH AIR BEARING AND RESISTANT TO TILT

[75] Inventor: Juan Hamilton Crawford, Dublin, Ohio

[73] Assignee: Industrial Nucleonics Corporation, Columbus, Ohio

[22] Filed: Sept. 5, 1972

[21] Appl. No.: 286,076

[52] U.S. Cl............................ 324/34 TK, 360/102
[51] Int. Cl............................................. G01r 33/00
[58] Field of Search .................... 324/34 TR, 61 P; 179/100.2 P; 340/174.1 E; 33/147 N, 147 L; 308/DIG. 1

[56] References Cited
UNITED STATES PATENTS

| 2,886,651 | 5/1959 | Vogel | 179/100.2 P |
| 2,921,144 | 1/1960 | Martin | 179/100.2 P |
| 3,617,872 | 11/1971 | Horn et al. | 324/34 TK |

Primary Examiner—Robert J. Corcoran
Attorney, Agent, or Firm—William T. Fryer, III; C. Henry Peterson

[57] ABSTRACT

A gauge is provided for measuring a particular property of a moving sheet or web of material. In a preferred embodiment, an air caliper gauge for measuring the thickness of sheet material comprises a sensing member floating on a gas film at a constant distance above the sheet and a sheet support below and in contact with the sheet. The sensing member and the sheet support form part of a transducer providing an indication of sheet thickness. The sensing member includes an interior gas chamber in communication with an external gas pressure supply. A plurality of channels connect the interior gas chamber with a plurality of gas-discharging openings or jets in the surface of the sensing member which is adjacent to the sheet. The channels are inclined downwardly and outwardly toward the periphery of the sensing member surface. The openings are located slightly further out than halfway between the center and the periphery of the surface. The inclination of the channels and the location of the openings are preferably arranged so as to provide a substantially maximum resistance to tilting impulses tending to drive the periphery of the sensing member surface into contact with the sheet. This resistance increases in a nonlinear fashion as the periphery approaches a condition of imminent contact with the sheet. Accordingly, the sensing member has a substantially maximum resistance to sheet contact, so that the possibility of damage to the sheet is substantially eliminated.

The present invention relates generally to measuring a particular property of material, and more specifically, to an improvement in apparatus for measuring the thickness of a moving material sheet or web wherein an element of the apparatus is maintained substantially in a state of equilibrium and at a constant distance from the sheet by means of a gas film interposed between the member and the sheet.

5 Claims, 9 Drawing Figures

MEASURING GAUGE WITH AIR BEARING AND RESISTANT TO TILT

CROSS REFERENCE TO RELATED APPLICATIONS

The present invention is related to the invention disclosed in U.S. Pat. No. 3,818,327 entitled "Measuring Gauge With Support For Holding Measured Sheet And Discharging Foreign Matter." of Allen D. Alexander, assigned to the assignee of the present invention and filed on even date herewith. The subject matter disclosed in the referenced patent that is claimed in the present application is the conception only of the inventor of the present application. Likewise, the subject matter disclosed in the present application that is claimed in the referenced patent is the conception only of the inventor of the referenced patent.

BACKGROUND

A typical application of the present invention is in a sheet caliper gauge. In the art relating to sheet calipering, it is known to measure the thickness of a moving sheet by means of a calipering element floating on a film of air above the surface of the sheet at a constant distance therefrom. oscillations in U.S. Pat. No. 1,946,924, issued Feb. 13, 1934 to A. Allen et al., discloses in one embodiment, a calipering gauge of this type wherein air is supplied under positive pressure to an annular outwardly directed slit situated near the center of a disc-shaped sensing head to maintain the same a predetermined constant distance from the sheet. One disadvantage of this sheet calipering system is that the free vertical movement of the sensing head relative to the sheet is hampered by friction in the ball-and-socket bearing joining the sensing head to a support. A further disadvantage is that the location of the air-venting orifice near the center of the sensing head may not provide adequate restoring force when the sensing head is momentarily tilted relative to the sheet. Such tilt may occur as a result of a sudden jolt to the apparatus from an external source or from resonance oscillatins in the sensing head due to periodically recurring vibrations in the sheet-processing machinery. When such tilt results in actual sheet contact by the periphery of the sensing head, the sheet is likely to be damaged or torn. When the calipering apparatus includes an underlying sheet-supporting surface, a sheet-contacting tilt is likely to result in the sheets being momentarily pinched between the sensing head and the sheet-supporting surface, causing a sheet break. The likelihood of a sheet break is increased when the sheet is under tension, when the sheet is being transported at a high rate of speed, and when the sheet material is incompletely cured, incompletely dried, or of a delicate composition.

U.S. Pat. No. 3,513,555, issued Mar. 30, 1967 to B. J. Vachon and U.S. Pat. No. 3,617,872, issued Nov. 2, 1971 to J. J. Horn et al, each disclose an air caliper gauge with a sensing head which floats on an air film produced by air flowing from a wide centrally located air chamber which is open on the side adjacent to the sheet. U.S. Pat. No. 3,528,002 issued Sept. 8, 1970 to E.O. Dunlavey, discloses an air caliper gauge with a floating sensing head composed in part of porous material through which air is forcibly expelled. The sensing head is rigidly held, except for movement normal to the sheet.

SUMMARY OF THE INVENTION

The present invention provides an improved gauge including a novel floating sensing head which is highly resistant to tilting movements caused by external or internal forces, and which is capable of righting itself quickly and decidedly in response to a tilting impulse, thus substantially reducing the possibility of a sheet break resulting from sheet contact by the sensing head. The invention makes possible a gauge design whereby the ability of the floating sensing head to resist forces tending to make it touch the sheet which it is measuring is substantially maximized.

In accordance with one preferred embodiment of the invention, an air caliper gauge for measuring a particular property, such as thickness, of sheet material comprises a member floating on an air film at a constant distance above the sheet, and a sheet support or guide member on the other side of the sheet. The floating member and the support means may together form part of a transducer for providing an indication of the particular property. Alternatively, the floating member alone may contain a transducer.

In a preferred embodiment for measuring the thickness of moving material, the floating member includes a proximity sensor and the support means contains electrically conductive material. This arrangement functions as a transducer circuit whose inductance varies with the distance between the sensor and the support means. To ensure that this distance varies solely in response to changes in sheet thickness, the moving sheet is maintained in substantial contact with the support means at all times without sheet vibration or flutter, by applying suction to a portion of the sheet through apertures in the surface of the support means. This suction may be provided in the manner described in the aforementioned application of A. Alexander.

The sensing member is connected to a mount allowing movement of the sensing member relative to the sheet. The sensing member has a surface which is to be maintained at a constant distance from the sheet by means of an intervening cushion of a gas such as air. The sensing member thus may be characterized as a gas bearing. The gas cushion is supplied with gas from gas-directing means in the form of one or more openings or jets in the surface of the sensing member which is adjacent to the sheet. The sensing member includes an interior gas-confining chamber in communication with an external gas pressure supply. One or more inclined channels serve as supply channels from the interior chamber to the openings in the surface. These channels are inclined downwardly and outwardly toward the external boundary or periphery of the surface.

The surface openings, from which gas is expelled with a high velocity toward the sheet, are located so that substantially the maximum restorative forces are obtained, and the inclination of the channels and the location of the openings are preferably arranged so as to obtain a notable increase in the resistance to tilt as the sensing member approaches contact with the sheet. That is, in order to ensure that the sensing member possesses substantially the optimum resistance to sheet contact, the gas supply channels and the openings in the surface are arranged first with the intention of obtaining the notable increase in resistance to tilt as the sensing member approaches sheet contact, while at the same time ensuring the production of substantially a maximum restorative force acting to restore the sensing member to its state of equilibrium in response to a tilting impulse. A gauge system is therefore provided having a high level of performance stability and accuracy. Furthermore, in the gauge system of the present invention the possibility of costly sheet breaks is substantially minimized.

OBJECTS OF THE INVENTION

Accordingly, it is an object of the present invention to provide an improved sheet material measuring system which has a high level of performance stability and accuracy.

It is another object of the present invention to provide an improved sheet material measuring system for measuring a particular property of sheet material in which the possibility of a sheet break resulting from contact with the sheet by the sensing member is substantially eliminated.

It is also an object of the present invention to provide an improved sheet material measuring system including a sensing member which produces substantially a maximum restorative action for restoring itself to a state of equilibrium relative to the sheet in response to a tilting impulse from internal or external forces, and comprising structure which is substantially optimally located to provide a marked increase in the restorative response to a tilting impulse as the peripheral portion of the sensing member enters a region of imminent contact with the sheet.

Further object and advantages will become apparent from the following detailed description of the preferred apparatus according to the invention, taken in conjunction with the appended drawing.

SHEET MATERIAL CALIPERING SYSTEM

Figures 1, 2:
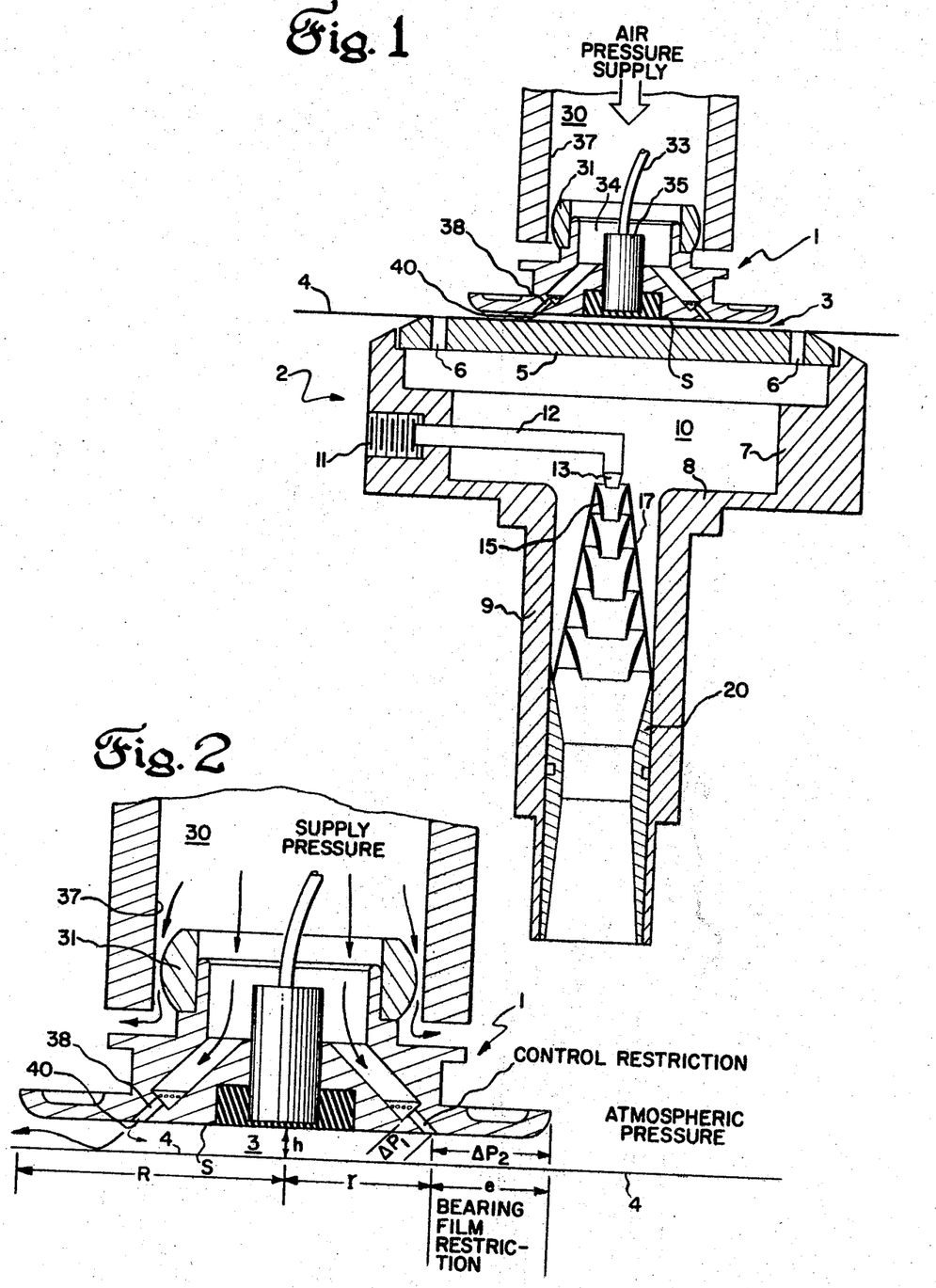
FIG. 1 is a sectional view of a portion of an improved sheet material measuring system according to a preferred embodiment of the invention.
FIG. 2 is a partially sectional, partially diagrammatic view of a floating sensing member according to a preferred embodiment of the invention, illustrating principles of gas bearing operation deemed necessary for an understanding of the operation of a preferred embodiment of the invention.

With reference now to FIG. 1, a portion of an improved sheet material caliper gauge system is shown illustrating a preferred embodiment of the invention. A sheet supporting means 2 is illustrated together with a member 1 floating on a gas film 3 above the surface of the sheet or web of material 4 to be measured. Floating member 1 and sheet supporting means 2 constitute part of the traversing portion of the gauging system.

Floating member 1 comprises sensing means responsive to variations in the distance between floating member 1 and sheet supporting means 2. By providing a gas film 3 of substantially constant thickness, floating sensing member 1 is maintained a constant distance from moving sheet 4, which passes between floating sensing member 1 and sheet supporting means 2. Thus any variation in the distance between sensing means 1 and sheet supporting means 2 detected by sensing means 1 will be attributable solely to a change in the thickness of sheet 4.

SHEET SUPPORTING MEANS

The details of the sheet supporting means 2 are described in the aforementioned copending application; however, a brief description of one embodiment of sheet supporting means 2 will serve to explain its function within the gauge system shown.

Sheet supporting means 2 comprises a gas-confining chamber 10 defined by an upper portion 5 having a plurality of apertures 6 therein, a side portion 7, and bottom portion 8. Apertures 6 communicate between gas-confining chamber 10 and the exterior surface of upper portion 5.

A fluid inlet pipe 12 is connected to an inlet opening 11 in the wall of side portion 7 for receiving a suitable air pressure fitting. Pipe 12 is bent at a right angle and terminates in a nozzle 13 directed downward through an opening in the floor of bottom portion 8. Fluid inlet pipe 12 is supplied with fluid, such as air, at positive pressure with respect to the pressure in gas-confining chamber 10, from an external source (not shown) such as an air compressor.

The lower part of bottom portion 8 defines a sleeve 9 into which is fitted a cylindrical member 20. Member 20, together with spider means 17, serves as a support for one or more means 15 in the form of inverted hollow truncated cones, receiving the fluid streaming from nozzle 13 into the open large end of frusto-conical means 15. Due to the high velocity of the fluid passing through the space within the open large end of frusto-conical means 15, a decrease in the pressure in this region results, in accordance with Bernoulli's principle, causing air or other ambient gas to be drawn from chamber 10 into the large end of frusto-conical means 15 through the opening between nozzle 13 and frusto-conical means 15. As air is withdrawn from chamber 10, the resulting negative pressure relative to the ambient pressure causes air to be drawn into chamber 10 through apertures 6 in upper portion 5 upon which moving sheet 4 is supported. The suction applied to sheet 4 is adjusted by means of a hand valve or pressure regulator (not shown) in the air line from the compressor. The suction so adjusted is just sufficient to maintain sheet 4 flush against the upper portion 5 without exerting undue suction to cause marking of the sheet or to hamper its progress. To provide sufficient volume of gas movement through apertures 6, additional frusto-conical means 15 of increasing sizes may be coaxially aligned so as to reduce the gas pressure within chamber 10 in several stages.

Sheet supporting means 2 serves to maintain sheet 4 in a stable condition as it is being measured, without vibration or flutter, thus maintaining the accuracy of the gauge system.

FLOATING SENSING MEMBER

In the preferred embodiment illustrated, floating sensing member 1, shown in cross-section in FIG. 1, is of circular shape when projected onto sheet 4. Sensing member 1 includes a rounded surface 31 disposed within a cylinder 30 having an internal cylindrical bearing surface 37. Cylinder 30 is supplied with gas, such as air, at positive pressure from an external source. Preferably the gas is filtered and its pressure closely regulated. A portion of this gas flows between bearing surfaces 31 and 37 maintaining bearing surface 31 spaced from bearing surface 37. In addition, gas flows into a gas-confining chamber 34, from which it is directed through a plurality of tubular channels 38 each having a discharge opening or jet 40.

Figure 7:
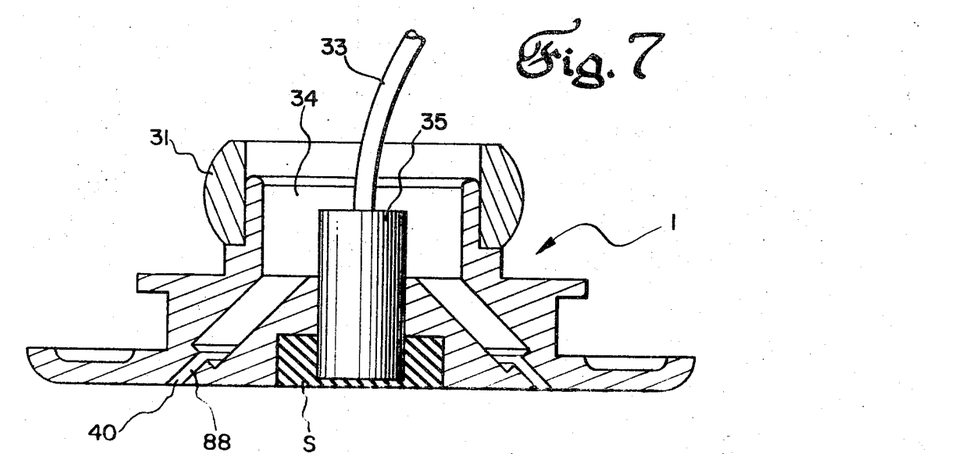
FIG. 7 is a sectional view of a floating sensing member according to an alternative embodiment of the invention.

The discharge openings 40 are arranged in an annular pattern on the lower surface S of sensing member 1 which is adjacent sheet 4. Surface S is impermeable to the flow of gas except at the location of openings 40. Discharge openings 40 comprise 62 discrete openings in the lower surface S of the sensing member 1 according to the preferred embodiment; however, the gas may alternatively be discharged through an opening in the form of a continuous annular slit, as shown in FIG. 7. Discharge openings 40 are preferably situated slightly greater than halfway between the center and the periphery of the lower surface S of sensing member 1. The positioning of discharge openings 40 is made in accordance with criteria to be described below, such that substantially the maximum resistance to sheet contact is obtained, including a marked increase in the resistance to tilt as the edge of sensing member 1 approaches a condition of sheet contact.

The lower portion of gas-confining chamber 34 and channels 38 are angled downward and outward from the central portion of gas-confining chamber 34 towards the periphery of the lower surface of sensing member 1. Gas flowing from discharge orifices 40 forms a gas cushion or film 3 or substantially constant thickness between sensing member 1 and sheet 4, thereby supporting sensing member 1 at a predetermined and constant distance from sheet 4.

Centrally located within sensing member 1 is a proximity sensor 35 which is connected via an electric cable 33 with a proximity circuit (not shown) which may be, for example, a Bently Nevada 3,000 Series circuit (available through the Bently Nevada Corp., Minden, Nevada), or the equivalent. Proximity sensor 35 is responsive to electrically conductive material in the upper portion 5 of sheet supporting means 2, with the result that variations in the distance between sensor 35 and upper portion 5 show up as measurable variations in the inductance of the proximity circuit of which sensor 35 is a part. Because sensor 35 is maintained a constant distance from sheet 4, any variation in the inductance of the proximity circuit will be indicative of a change in the thickness of sheet 4.

GAS BEARING OPERATION

An analysis of the operation of a gas bearing including a discussion of several of the basic physical principles underlying such operation will serve to explain the need for fairly critical structural considerations as a basis for attaining the desired resistance to sheet contact. Referring to FIG. 2, a gas bearing member, shown here as sensing member 1, is supplied with gas at a constant pressure. Part of this gas flows directly to the ambient atmosphere between surfaces 31 and 37. Since surface 31 of bearing member 1 is rounded and surface 37 of cylinder 30 is cylindrical, angular or vertical motions of bearing member 1 with respect to cylinder 30 will not significantly change the shape or dimensions of the gap between surfaces 31 and 17. Consequently, the small flow of gas escaping through this gap will be constant, because the supply pressure is fixed. This flow has little if any effect on the stability of bearing member 1, since the forces exerted on surface 31 of bearing member 1 will be constant.

The greater portion of the gas passes first through the bearing member 1, then through the space between sheet 4 and sensing member 1 to form gas film 3. It is eventually vented to the ambient atmosphere, which is at a lower constant pressure. It is this latter gas flow upon which the stability of bearing member 1 is primarily dependent, and it is this gas flow which will be analyzed in detail below.

As gas flows from the supply to atmosphere, its pressure decreases in two stages. The first pressure drop occurs as the gas flows through a narrow channel within bearing member 1 known as the control restriction, seen in FIG. 2 as tubular channel 38. The second pressure drop occurs as the gas flows from the venting opening 40 through a peripheral portion of the thin gas film 3 to the atmosphere. This portion of the gas film 3 is known as the bearing film restriction. The sum of the first pressure drop and the second pressure drop is equal to the overall pressure drop from the air supply pressure to the atmosphere.

Expressed mathematically, $$\Delta P_{Total} = \Delta P_1 + \Delta P_2 \quad (1)$$

where $\Delta P_{Total}$ is the total pressure drop between the supply and atmosphere, $\Delta P_1$ is the pressure drop through the control restriction, and $\Delta P_2$ is the pressure drop through the bearing film restriction.

The total mass flow of gas through the bearing is determined by the supply pressure and atmospheric pressure, which are fixed, and by the resistances to flow offered by the control restriction and the bearing film restriction, respectively. The latter resistance to flow is variable; the total mass flow may therefore vary. But for a given mass flow, the amount passed by each of the resistances in succession is the same.

The pressure drop across each resistance is equal to the product of the mass flow and the value of the resistance:

$$\Delta P_1 = \text{(mass flow)} \times \text{(control restriction resistance)} \quad (2)$$

$$\Delta P_2 = \text{(mass flow)} \times \text{(bearing film resistance)} \quad (3)$$

The control restriction resistance here remains constant, but the bearing film resistance varies inversely with the third power of the bearing film thickness $h$. *Gas Lubrication*, V. N. Constantinescu, Amer.Soc. Mech.Engr.'s, N.Y., 1969, p. 80.

Equations (2) and (3) may be combined, giving $$(\Delta P_2 / P_1) = \text{(bearing film resistance/control restriction resistance)} \quad (4)$$

The mass flows, being equal, cancel out.
Letting
$b$ = bearing film resistance
$c$ = control restriction resistance
and substituting in equation (4) the value for $\Delta P_1$ from equation (1), $(\Delta P_2/\Delta P_{Total} - \Delta P_2) = b/c$
$\Delta P_2 \cdot c = \Delta P_{Total} \cdot b - \Delta P_2 \cdot b$ $$\Delta P_2 = \Delta P_{Total} \cdot b/(b+c) \quad (5)$$

In equation (5), $\Delta P_{Total}$ is fixed and $c$ is fixed, so $\Delta P_2$ depends only on the bearing film resistance, which varies inversely with $h^3$. Therefore if $h$ decreases $\Delta P_2$ will increase, and vice versa.

The total upward force exerted against bearing member 1 is the integrated product of the gas pressure in the bearing film 3 and the area of the bearing member surface S. The pressure is highest, equal to $\Delta P_2$ above atmospheric pressure, where the gas first enters the bearing film, and it decreases as the gas flows radially outwards to atmosphere. If $h$ decreases, $\Delta P_2$ increases, and the upward force increases, tending to push bearing member 1 apart from the sheet 4 and increases $h$. Therefore, for a given applied force, $h$ will assume a stable value, and the bearing film 3 acts as a spring. If $h$ is small, the upward force is large. If $h$ is large, the upward force is small.

The case where the bearing member surface S is not parallel to the sheet 4 but is tilted will now be considered. Assuming that the center of bearing member 1 is maintained at the same height as before, as one side of the bearing goes down, the other will go up in the same amount. On the lowered side, where the height has diminished, the gas flow will slow down, and a relatively high pressure will result. On the raised side, where the height has increased, the gas flow will have greater velocity and the pressure will drop. In some cases, depending upon the design of the bearing, the pressure in this region may drop below atmospheric pressure. The upward force developed by the pressure in the thin area of the bearing film 3 is relatively large, and that developed in the thick area is quite small and may in fact be directed downward if the resultant pressure in this area is below atmospheric pressure, so that a righting couple, or restoring action, is developed which will tend to restore the bearing member to its original position of equilibrium parallel to the sheet.

The substantial maximization of this restoring action is one important feature of the present invention. To achieve a substantially maximum restoring action, it is necessary (1) to maximize the difference in the restorative forces directed against opposing sides of the bearing member by maximizing the pressure differences across the bearing member surface, essentially in the manner to be shown below and (2) to move the gas-discharging openings out from the center of the bearing member surface in order to increase the lengths of the moment arms upon which the restorative forces act, but only to an extent dependent upon other factors to be described below.

MAXIMIZATION OF RESTORATIVE ACTION

The particular structure and the particular location of the arrangement for directing gas through the bearing member 1, comprising channels 38 and gas-discharging openings 40, are of significant importance in substantially maximizing the restorative forces acting upon the bearing member. By a careful construction of the gas-directing arrangement, the difference between the large positive force produced for the thin area of the bearing film and the small positive or negative force produced for the thick area of the bearing film may be substantially maximized.

Figure 3A:
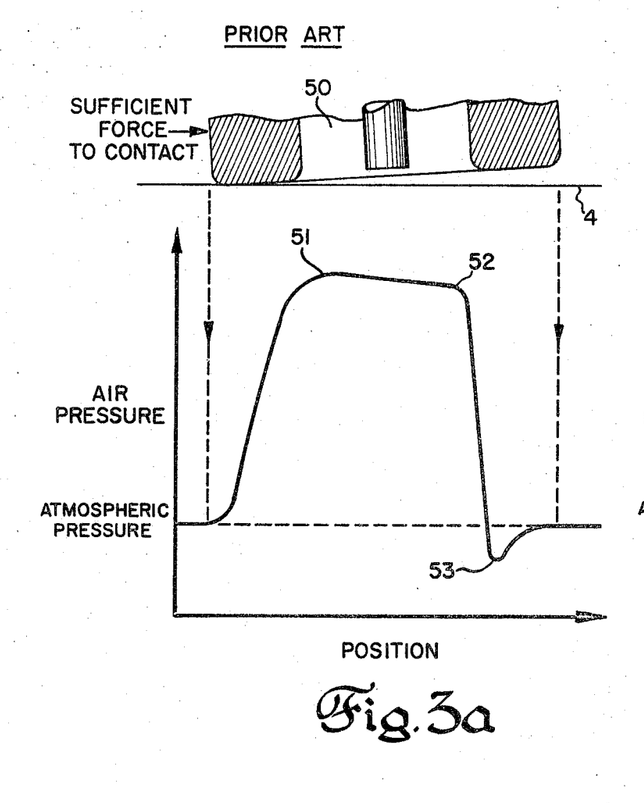
FIG. 3a is a sectional view of a portion of a floating sensing member of the prior art, shown in a tilted position with an edge thereof in contact with the sheet, together with a graph of the air pressure profile across the sensing member from the contacting edge to the opposite edge. Although this figure illustrates known apparatus, and is labelled as such, it is deemed essential for a clear understanding of the present invention.

Reference may now be had to FIG. 3a wherein a graph of the pressure at various diametrical points in the bearing film beneath a prior art bearing member of the type having an open central chamber 50 is shown for the maximum condition of tilt. The condition of sheet contact was created by applying sufficient force against the bearing member in a direction parallel to the sheet to force the edge of the bearing member against the sheet. Measurements of the pressure within the bearing film were taken at various points along a line from the contacting edge to the opposite edge to obtain a pressure profile across the bearing member surface.

In accordance with the principles of gas bearing operation outlined above, one side of the bearing member rises when the other side is forced down, and the air in the central portion of the gas film tends to escape through this larger gap at a relatively high velocity, causing a decreased pressure, falling slightly below atmospheric pressure due to the Bernoulli principle. The dip below atmospheric pressure is represented by the region 53 of the profile curve. Pressure under the depressed side of the bearing member remains high in the area under the central chamber 50, as shown by region 51 of the profile curve, but falls off rapidly from there to the edge. Importantly, all of the air in the central chamber 50 remains at approximately the same pressure, seen by the fact that the section of the profile curve between regions 51 and 52 has only a slight downward slope. A relatively large pressure difference occurs between regions 52 and 53, but since these regions lie on the same side of the bearing member, they do not constitute a restoring couple. The main restoring couple, produced by the pressure difference between regions 51 and 53 on opposite sides of the bearing member surface, is diminished to a considerable extent by the high pressure region 52 on the same side as low pressure region 53.

Figure 3B:
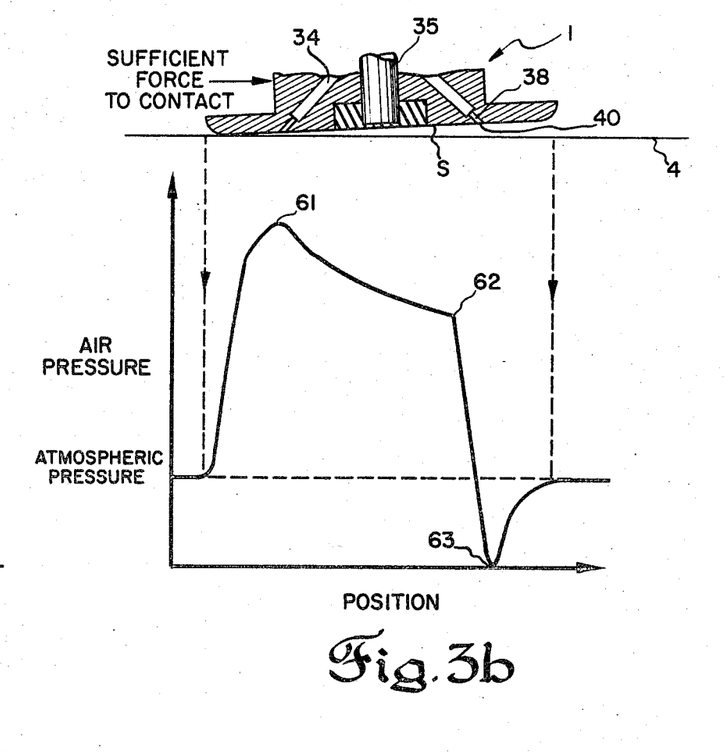
FIG. 3b is a sectional view of a portion of a floating sensing member, according to a preferred embodiment of the invention, shown in a tilted position with an edge thereof in contact with the sheet, together with a graph of the air pressure profile across the sensing member from the contacting edge to the opposite edge. The air pressure represented in FIGS. 3a and 3b are air pressures relative to the atmospheric pressure, not absolute air pressures.

With reference to FIG. 3b, depicting the pressure profile across bearing member 1 of the present invention for a condition of sheet contact, it is seen that the pressure difference is noticeably greater and occurs across a substantially wider region of the bearing member surface S. Because of the inclination of channels 38, the air leaving the openings 40 on the depressed side of the bearing is forcibly jetted directly into the thin film region between the openings 40 and the contacting periphery, resulting in a relatively higher pressure in the depressed region. On the raised side of the bearing member 1, air is jetted from openings 40 out through the much lower resistance path to atmosphere, resulting in a relatively greater Bernoulli pressure drop in the region between the openings 40 and the periphery of bearing member 1, It is seen, by a comparison of FIGS. 3a and 3b, that the difference in pressure between the pressure peak 61 and the pressure dip 63 produced by bearing member 1 is noticeably greater than the pressure drop from pressure peak 51 to pressure dip 53 of the prior art bearing member. As a consequence, bearing member 1 of the present invention produces a greater restoring couple when it is tilted.

It will also be noted, referring to FIG. 3b, that a more marked pressure decrease occurs over the region from pressure peak 61 to the region 62 than occurs across a corresponding section of the surface of the prior art bearing member. The falling away of the pressure within the central portion of bearing member 1 heightens the restoring couple when the bearing member 1 is in a condition of tilt.

For bearing members having one or more relatively narrow discharge openings, in which the channels conveying air to the discharge openings are not inclined but are normal to the bearing member surface, such as those described, for example, in the aforementioned book *Gas Lubrication*, p.207 and in *Amer. Soc. Lubrication Engineers Transactions* 7 (1964), pp. 269-276, the pressure profile variation will predictably be more pronounced than that of the prior art bearing member shown in FIG. 3a, but substantially less than that obtained for bearing member 1 of the present invention, having inclined gas-directing structure.

The inclination of the channels 38 contributes significantly to the large air pressure difference obtained when bearing member 1 is tilted. This may be seen by reference to FIGS. 4a and 4b. Because the gas-directing structure of bearing member 1 is outwardly and downwardly inclined towards the periphery of the bearing member surface S, the air issuing from the gas-discharging opening 40 is used effectively to increase the pressure in the thin film region. As seen in FIG. 4b, the inertia of the expelled air carries it into the thinnest portion of the gas film underlying the edge of bearing member 1 closest to sheet 4, preferentially increasing the pressure and thus the upward restorative force in this region.

The inclined arrangement of the gas-directing structure also utilizes the considerable momentum of the air moving through channels 38 and openings 40. Air, for example, has a density greater than an ounce per cubic foot. The resultant momentum of the fast-moving air may be analyzed as comprising a first momentum component directed normal to the sheet and a second momentum component directed parallel to the sheet in the direction of the peripheral portion of bearing member 1 that is adjacent opening 40. The downwardly directed first momentum component helps push the depressed side of bearing member 1 back to its equilibrium position. The outwardly directed second momentum component ensures that most of the air will flow into the thin film region, where it will pneumatically raise the depressed side of bearing member 1.

Figure 4A:
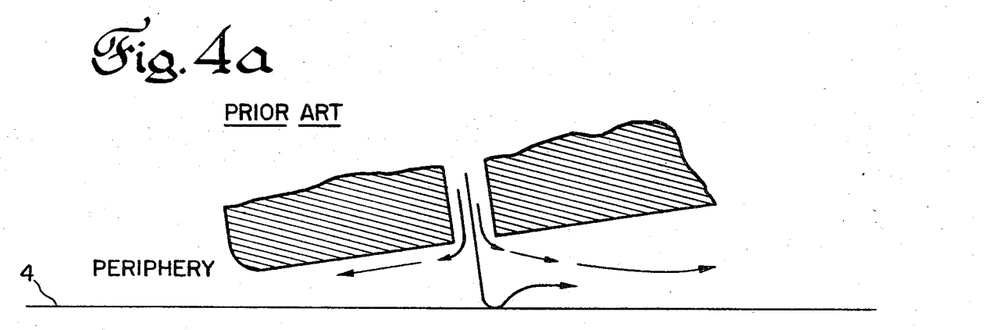
FIG. 4a is a diagrammatic representation of the flow of air within the air film which is interposed between a floating sensing member of the prior art and a sheet, for a condition of tilt. Although this figure illustrates the operation of known apparatus, and is labelled as such, it is also deemed essential for a clear understanding of the present invention.
Figure 4B:
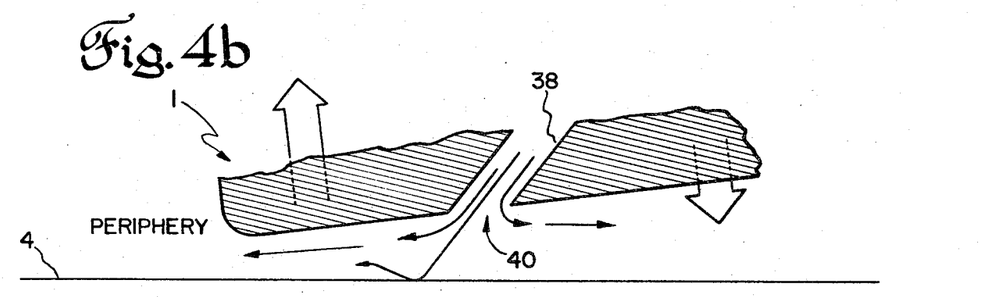
FIG. 4b is a diagrammatic representation of the flow of air within the air film which is interposed between a sheet and a floating sensing member according to a preferred embodiment of the invention, for a condition of tilt.

In the case of gas-directing structure normal to the bearing member surface, as in the prior art bearing member depicted in FIG. 4a, the air tends to escape preferentially into the thicker part of the gas film when the bearing member is tilted. Relatively little of the air flows beneath the portion of the surface closest to the sheet. As a result, less pressure is developed beneath this portion, and contact of this portion with the sheet may occur more readily.

Referring to FIG. 2 again, there are limits upon the length of the moment arm r which may be utilized without diminishing the magnitude of the restorative forces. This is because, as stated above, the upwardly directed force is proportional to the pressure that is developed against the depressed side of the bearing member. Considering now a bearing member in a condition of equilibrium, the upwardly directed pressure, equal to $\Delta P_2$ above atmospheric pressure, varies directly with the length of the bearing film resistance $b$, as shown in equation (5). The bearing film resistance $b$ is large when the bearing film restriction e is large. Conversely, the bearing film resistance is small when the bearing film restriction $e$ is small, i.e., when the discharge opening is close to the periphery of the bearing surface S. The mathematical relationship between the bearing film resistance $b$ and the position of the discharge opening is $b = 1n(R/r)$, where $R$ is the radial distance from the center to the periphery of the bearing member 1 and $r$ is the radial distance from the center to the location of the discharge opening 40, at which point the bearing film restriction begins. *Gas Lubrication*, p. 77.

It will be seen that if the discharge opening 40 is located near the periphery, $r$ is nearly equal to $R$, and the quantity $1n(R/r)$ becomes nearly equal to 0, indicating a minimal bearing film resistance and a minimal $\Delta P_2$, so that the pressure within the bearing film exerted against the bearing member surface S is minimal. Although the moment arm $r$ is here very large, the upwardly directed force is nearly zero, giving practically zero righting couple. On the other hand, positioning the discharge opening near the center of the bearing member surface S may be shown to result in a relatively high pressure in the central region of the bearing film 3 but a very small moment arm r and thus a very small restoring couple.

As stated above, the pressure under the depressed side of a tilted bearing member is greater, and the restorative force is greater than the corresponding pressure and restorative force for a bearing member in a condition of equilibrium; however, the maximum attainable restoring action for any bearing member is ultimately dependent upon the radial location of the openings in the bearing member surface, among other structural factors.

The precise relationship between the radial positioning of the discharge openings and the amount of restorative action produced to resist a tilting movement is not known. However, since it is shown above that the peak restorative action occurs in the usual case when the discharge openings are positioned further out than the center and further in than the periphery of the bearing member surface, it may be stated, as a reasonable first approximation of the relationship, that the discharge openings should be located halfway along a radial line R between the center and the periphery of the surface to achieve substantially the maximum restorative action.

The restorative action produced for a particular radial location of discharge openings in a given bearing member may be quantitatively determined in the following manner. A pendulum set up beside the operating bearing member is pulled back to a given angle and released so that the pendulum mass strikes cylinder 30 with sufficient momentum to momentarily displace it sideways. This sideways displacement is transferred via bearing surfaces 37 and 31 to the upper part of the bearing member. This sudden sideways displacement, being applied above the center of gravity of the bearing member, causes it to tilt momentarily. The angle at which the pendulum is released is increased for successive tests until the edge of the bearing member eventually makes contact with the sheet. Contact may be verified if the bearing member surface has been painted with a marking substance beforehand. The maximum angle from which the pendulum can be released without causing contact of the bearing member with the sheet is thus an indication of the restorative action produced by the bearing member. Bearing members with openings located at different radial positions may be similarly tested, and the results may be correlated to give the position where substantially the maximum restorative action is produced.

NONLINEAR RESTORATIVE ACTION NEAR CONDITION OF SHEET CONTACT

Figure 5:
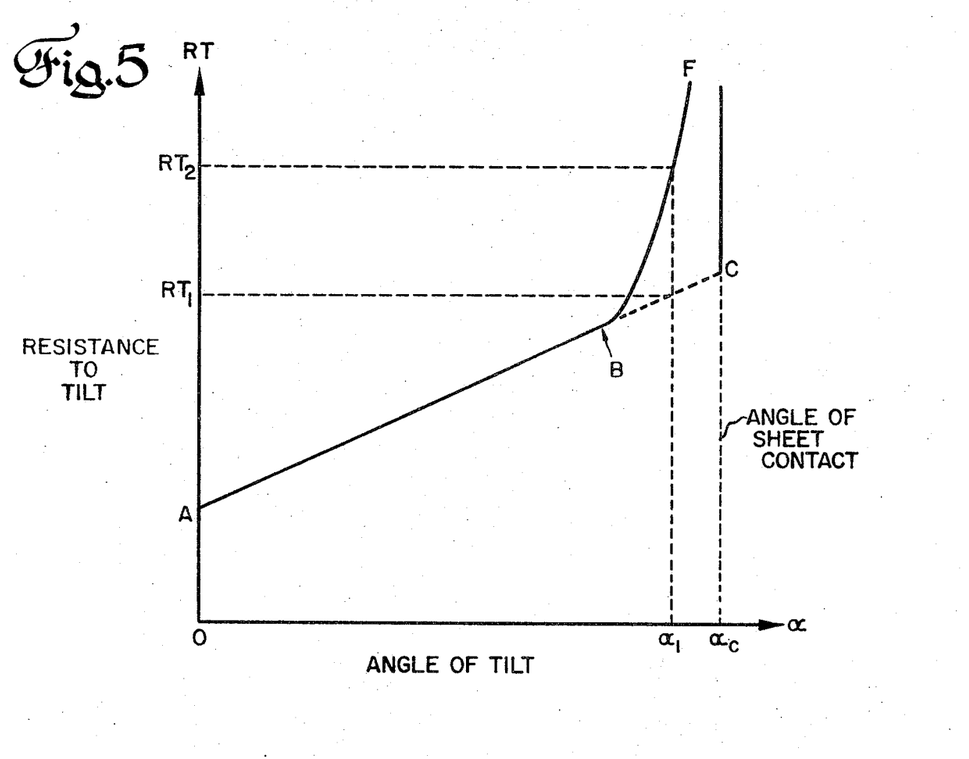
FIG. 5 is a graph illustrating the relationship between the amount of resistance to tilt produced by the floating sensing member of the present invention in relation to the angle at which the sensing member is tilted from an equilibrium position, and illustrating the substantially non-linear resistance to tilting produced by the sensing member as an edge thereof approaches contact with the sheet, in accordance with a preferred embodiment of the invention.

With reference now to FIG. 5, a graph is shown illustrating the resistance to tilt RT produced in bearing member 1 for various angles of tilt away from its equilibrium position. While the graph of FIG. 5 is not based upon actual measurements, it represents a reasoned engineering analysis of the operation of the bearing members referred to below. For the angle $\alpha = 0$, corresponding to the equilibrium position, bearing member 1 possesses a positive, finite resistance to tilt A, indicative of the ability of bearing member 1 to resist tilting impulses tending to displace it from its equilibrium position. As the angle $\alpha$ is increased, the resistance to tilt RT increases in a substantially linear fashion to point B.

For prior art bearing members, the substantially linear relationship between the resistance to tilt RT and the angle of tilt $\alpha$ would continue until the angle of sheet contact $\alpha_C$ is reached, as shown by the broken line BC in FIG. 5. At the angle of sheet contact $\alpha_C$, the resistance to tilt RT becomes substantially infinite due to the fact that further rotational movement of the bearing member is not possible owing to the condition of contact. Thus the resistance to tilt RT produced in the prior art bearing members is seen as increasing in substantially linear fashion as the bearing member is tilted further and further away from the equilibrium position until the condition of sheet contact is reached.

It is an important feature of the present invention that, as bearing member 1 approaches contact with the sheet, the resistance to tilt produced by bearing member 1 markedly increases, in a nonlinear fashion, as approximated by the graph line segment BF of FIG. 5. The nonlinearity of resistance evidenced by bearing member 1 as the edge thereof approaches sheet contact offers a distinct advantage over the prior art bearing member in terms of reducing the possibility of sheet contact and the ensuing sheet breaks.

Referring to FIG. 5 once again, for the purpose of comparing the performance of bearing member 1 and a prior art bearing member in producing a resistance to tilt RT for a given angle of tilt $\alpha_1$, the prior art bearing member will develop a resistance $RT_1$ whereas for the same angle $\alpha_1$ bearing member 1 will generate a substantially larger resistance $RT_2$. The ability of bearing member 1 to produce a markedly greater resistance to sheet contact as contact becomes imminent, in effect constituting a "last-ditch effort," is an important factor in the stability design of the present invention.

STRUCTURAL ARRANGEMENTS FOR SUBSTANTIALLY MAXIMUM RESISTANCE TO SHEET CONTACT

In order to obtain substantially the maximum resistance to sheet contact, the gas-directing structure of bearing member 1 is arranged so as to obtain substantially the maximum restorative action produced in response to a tilting impulse, while at the same time obtaining the benefit of the markedly greater resistance to sheet contact as such contact becomes imminent. As stated above with respect to the positioning of discharge openings in a bearing member surface, the normally predicted location for obtaining substantially the maximum restorative action would be at a point halfway between the center and the periphery of the bearing member surface. Based on presently available information, the nonlinear resistance function is obtained in bearing member 1 of the present invention when the gas-discharging openings 40 are located at a position within a range of radial positions greater than half the radial distance. The criteria for determining the preferred location of discharge openings 40 are outlined below. In a preferred embodiment of bearing member 1, openings 40 are of such a size that the distance across an opening 40 along a line between the center and the periphery of the bearing member surface S is an order of magnitude smaller, i.e., at least ten times smaller, than the distance between the center and the periphery.

The nonlinear resistance function is also presently attributed in part to the inclination of the gas-directing structure of bearing member 1, including inclined channels 38. In the preferred embodiment, the gas-directing structure, including tubular channels 38, is inclined at an angle of approximately 45° to the bearing member surface S.

Figure 6:
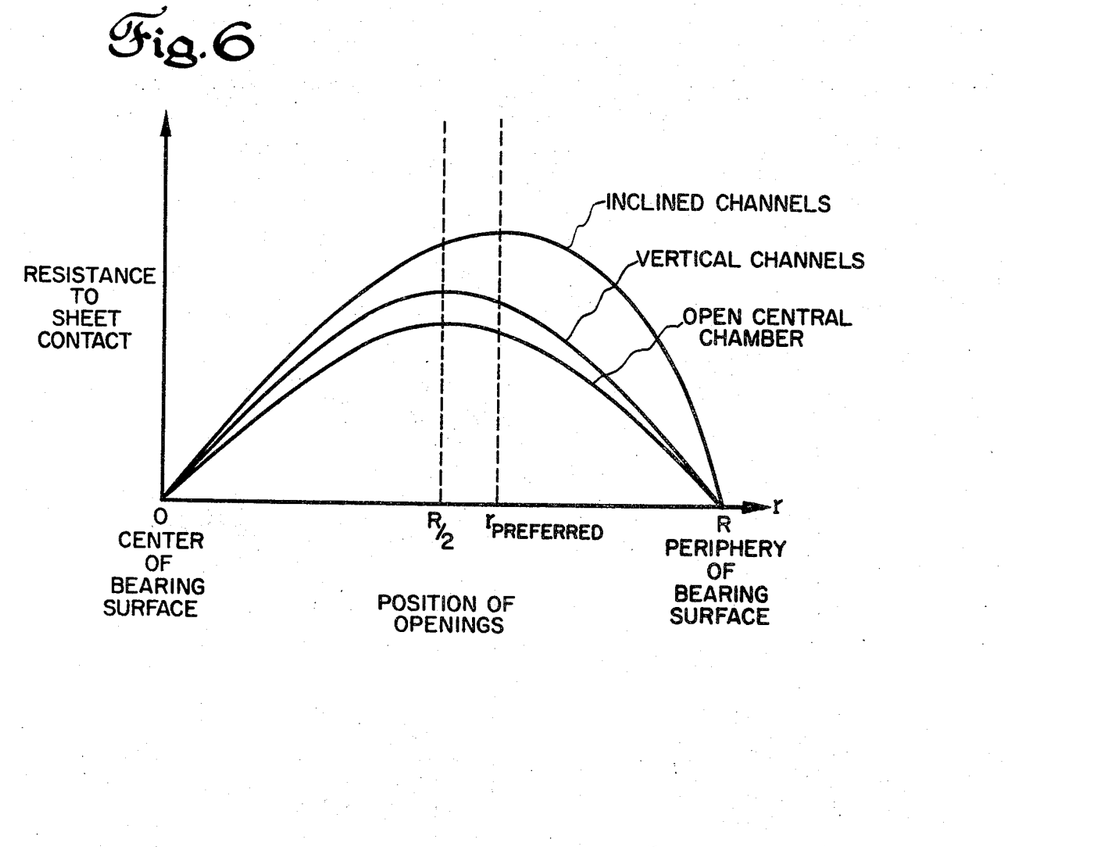
FIG. 6 consists of three graphs, each showing the resistance to sheet contact produced by a different floating member as a function of the position of the gas-venting openings in the surface of the member along a line between the center and the periphery of such surface. These graphs together show a comparison of the characteristics of a prior art floating sensing member having an open central chamber, a prior art floating gas bearing member having gas-directing channels which are vertical relative to the sensing member surface, and a floating sensing member having gas-directing channels which are inclined relative to the sensing member surface, according to a preferred embodiment of the invention.

With reference now to FIG. 6, graphs are shown of the resistance to sheet contact of several types of bearing members having different gas-directing arrangements. For each of the three types of bearing members shown, the resistance to sheet contact due to tipping has been plotted as a function of the position of the gas-discharging openings in the bearing member surface along a line between the center and the periphery of such surface. It should be understood that the graphs shown in FIG. 6 are not based on actual measurements. However, they represent the best engineering analysis possible based on present information.

For a prior art bearing member of the type having an open central chamber of radius $r$, the optimum resistance to sheet contact is developed when the radius $r$ of the central chamber is located approximately halfway between the center and the periphery of the bearing member surface, i.e., at R/2. Similarly, for the prior art bearing member having one or more relatively small gas-discharging openings arranged annularly in its surface and supplied by gas-directing channels which are vertical with respect to the bearing member surface, the optimum resistance to sheet contact is obtained when the openings are located approximately halfway between the center and the periphery at R/2. The maximum resistance to sheet contact produced in the latter bearing member is greater than that produced by the bearing member having an open central chamber.

Bearing member 1 of the present invention 1 having inclined channels 38 communicating with the gas-discharging openings 40, develops a substantially maximum resistance to contact when the gas-discharging openings 40 are located slightly further towards the periphery of bearing member surface S than a point halfway along a line between the center and the periphery of bearing member surface S. The position $r_{PREFERRED}$ shown in FIG. 6 represents the radial location of discharge openings 40 at which substantially the maximum resistance to sheet contact is obtained. It should be understood, however, that position $r_{PREFERRED}$ is merely an exemplary point within a range of suitable positions, lying beyond the halfway point R/2, each providing to some significant extent the nonlinear resistance to sheet contact as the bearing member 1 approaches the condition of sheet contact.

Although the precise limits of this range are not presently known, a particular bearing member may be tested to ascertain whether the resistance to contact is significantly nonlinear near the condition of sheet contact, in the following manner. A micrometer screw attached to a pressure sensor is placed against the side of the operating bearing member in a direction parallel to the sheet. The screw is tightened until the bearing member is tilted slightly away from equilibrium. Suitable means are used to measure the actual angle of displacement. The pressure required to effect such displacement is also recorded. Coordinated measurements of pressure and displacement angle are made for a succession of different screw positions until eventually sheet contact is made. Pressure is plotted as function of displacement angle to determine whether the location of the gas-discharging openings in the particular bearing member does, in fact, provide the desired nonlinearity as the bearing member is tilted into contact with the sheet.

It should be understood that, disregarding the nonlinear restorative action produced when bearing member 1 approaches sheet contact, the location of the gas-discharging openings 40 in bearing member 1 for optimum restorative action would normally be halfway between the center and the periphery of the bearing member surface S, essentially the same location as for the optimum restorative action produced by the prior art bearing members. The restorative action, or resistance to tilt, is substantially greater even at the R/2 position of the openings 40 than with the prior art devices, due to the substantially maximum variations in gas pressure developed across the surface S of bearing member 1 (FIG. 3b). When the openings 40 in bearing member 1 are positioned slightly further toward the periphery, in accordance with the test procedure given above or a similar procedure for determining the location of openings 40 providing the greatest nonlinearity, some of the restorative ability may be diminished for small angles of tilt $\alpha$, i.e., when bearing member 1 is not yet so close to the sheet as to produce the nonlinear restorative action. However, as bearing member 1 approaches contact with the sheet 4, the contribution of the nonlinear effect becomes combined with the substantially maximum restorative action produced at this position of the openings 40 to yield substantially a maximum resistance to sheet contact. In other words, for the particular inclination of the gas-directing structure and the particular location of the gas-discharging openings 40, a large amount of restorative action is produced as the bearing member 1 is tilted relative to the sheet 4, which restorative action significantly increases in magnitude as the bearing member gets closer and closer to the sheet, reaching its effective maximum just before the point of contact. The maximum resistance to sheet contact produced by the bearing member of the present invention is substantially greater than that developed by the prior art bearing members. Accordingly, the incidence of sheet contact in the sheet material calipering system of the present invention is extremely low.

It will be apparent to one skilled in the art that numerous modifications may be made to the invention herein shown and described without departing from the scope and intent of the invention as recited in the appended claims. For example, any suitable type of sensing circuit may be employed to measure the particular desired property of the sheet 4. Further, the sensing circuit could be positioned in the sheet-supporting means 2 rather than in the floating bearing member 1. Bearing member 1 may be used in connection with sheet supporting means 2 of any suitable construction for maintaining sheet 4 in a relatively constant positional relationship. In addition, the lower surface of bearing member 1 may be other than circular, e.g., oval or rectangular.

What is claimed is:

1. In an apparatus for measuring a property of a material sheet, including a member connected to a mount means allowing movement of said member relative to said sheet, said member comprising a sensor means for responding to said sheet property and a substantially flat surface which is to be maintained at a constant distance from said sheet by means including a gas film interposed between said surface and said sheet, said gas film being maintained by a flow of gas from gas-directing means in said member connecting a gas-confining chamber in said member with said surface and maintaining said member substantially in a state of equilibrium with respect to said sheet but subject to tilting movement relative to said sheet, the improvement wherein said gas-directing means comrises at least one gas-discharging opening in said surface located at a position that is slightly greater than halfway towards the periphery of said surface along a line between the center and the periphery of said surface, the distance across said opening along said line being at least an order of magnitude smaller than the length of said line, said surface being impermeable to the flow of said gas except at the location of said opening, said gas-directing means comprising at least one channel inclined relative to said sheet for directing the flow of gas through said opening towards said sheet in the direction of said surface periphery with a resultant momentum comprising a first momentum component normal to said sheet and a second momentum component parallel to said sheet in the direction of the periphery that is adjacent said opening, said flow of gas being of a magnitude sufficient to maintain said member at said constant distance from said sheet when said member is in said state of equilibrium relative to said sheet, the inclination of said at least one channel and the location of said at least one opening being so related to the flow of gas from said opening to the periphery that substantially maximum variations in gas pressure occur at different points on said surface when said member is tilted relative to said sheet to produce a substantially maximum restorative action tending to restore said member to said state of equilibrium, while for the same inclination and location the amount of said restorative action first increases in a substantially linear relationship with an increase in the angle at which said member is tilted, tilted relative to said sheet and then increases more markedly in a substantially nonlinear relationship as said member further approaches contact with said sheet.

2. The apparatus according to claim 1, wherein said gas-directing means comprises a plurality of gas-discharging openings in said surface and a plurality of channels extending between said gas-confining chamber and said gas-discharging openings.

3. The apparatus according to claim 2, wherein the projection of the periphery of said member surface on said sheet is substantially in the form of a circle, and said gas-discharging openings are located at a distance from the center of said surface which is slightly greater than one half the radius of said circle.

4. The apparatus according to claim 1, wherein said gas-directing means comprises an annular gas-discharging opening in said surface.

5. The apparatus according to claim 4, wherein the projection of the periphery of said member surface on said sheet is substantially in the form of a circle, and said annular discharge opening in said surface is located at a distance from the center of said surface which is slightly greater than one half the radius of said circle.

* * * * *